United States Patent
Baldwin

(10) Patent No.: US 10,046,422 B2
(45) Date of Patent: Aug. 14, 2018

(54) EXTRUSION PIECE WITH INSERT OF DISSIMILAR MATERIAL

(71) Applicant: Tesla Motors, Inc., Palo Alto, CA (US)

(72) Inventor: Michael J. Baldwin, Warwickshire (GB)

(73) Assignee: TESLA, INC., Palo Alto, CA (US)

( * ) Notice: Subject to any disclaimer, the term of this patent is extended or adjusted under 35 U.S.C. 154(b) by 320 days.

(21) Appl. No.: 15/099,883

(22) Filed: Apr. 15, 2016

(65) Prior Publication Data

US 2016/0229002 A1   Aug. 11, 2016

Related U.S. Application Data

(62) Division of application No. 13/886,672, filed on May 3, 2013, now Pat. No. 9,340,232.

(51) Int. Cl.
| | |
|---|---|
| B23K 37/04 | (2006.01) |
| B62D 25/02 | (2006.01) |
| B23K 9/23 | (2006.01) |
| B23K 11/11 | (2006.01) |
| B23K 11/20 | (2006.01) |
| C09J 5/00 | (2006.01) |
| B23K 101/00 | (2006.01) |
| B23K 101/28 | (2006.01) |
| B23K 103/04 | (2006.01) |
| B23K 103/20 | (2006.01) |

(52) U.S. Cl.
CPC ............. *B23K 37/04* (2013.01); *B23K 9/232* (2013.01); *B23K 11/115* (2013.01); *B23K 11/20* (2013.01); *B62D 25/025* (2013.01); *C09J 5/00* (2013.01); *B23K 2201/006* (2013.01); *B23K 2201/28* (2013.01); *B23K 2203/04* (2013.01); *B23K 2203/20* (2013.01)

(58) Field of Classification Search
CPC ...... B23K 37/04; B23K 9/232; B23K 11/115; B23K 11/20; B23K 2201/006; B23K 2201/28; B23K 2203/04; B23K 2203/20; B62D 25/025; C09J 5/00
See application file for complete search history.

(56) References Cited

U.S. PATENT DOCUMENTS

| | | | |
|---|---|---|---|
| 4,472,469 | A | 9/1984 | Thies |
| 4,553,361 | A | 11/1985 | Ralph |
| 4,792,081 | A | 12/1988 | Kaye |
| 4,943,335 | A | 7/1990 | Schroder et al. |
| 5,786,047 | A | 7/1998 | Tomblin |

(Continued)

FOREIGN PATENT DOCUMENTS

CN   102794324 A   11/2012

OTHER PUBLICATIONS

Frank G. Armao, Welding aluminum piping, Oct. 11, 2005, 5 pages.

(Continued)

*Primary Examiner* — D Glenn Dayoan
*Assistant Examiner* — Melissa A Black
(74) *Attorney, Agent, or Firm* — Garlick & Markison; Bruce E. Garlick

(57) ABSTRACT

A profile piece includes: an extruded piece of a first material having a mouth portion along at least part of its length; and an insert of a second material different than the first material, the insert attached to the extruded piece by the mouth portion, wherein the insert is configured for welding the profile piece to a component of a third material different than the first material.

17 Claims, 3 Drawing Sheets

(56) References Cited

U.S. PATENT DOCUMENTS

| | | |
|---|---|---|
| 6,676,865 B2 | 1/2004 | Kobayashi et al. |
| 2009/0211184 A1 | 8/2009 | Kerscher |
| 2012/0153682 A1 | 6/2012 | Rawlinson et al. |

OTHER PUBLICATIONS

YangYang Zhao, et al., Resistance Spot Welding of Ultra-Thin Automotive Steel, J. Manuf. Sci. Eng. 135(2), 021012 (Mar. 22, 2013), 4 pages.

Spot welding, Wikipedia, the free encyclopedia, Feb. 23, 2012, 6 pages.

EXTRUSION PIECE WITH INSERT OF DISSIMILAR MATERIAL

CROSS-REFERENCE TO RELATED APPLICATION

This application is a divisional of U.S. patent application Ser. No. 13/886,672, filed May 3, 2013 and entitled EXTRUSION PIECE WITH INSERT OF DISSIMILAR MATERIAL, the entire contents of which are hereby incorporated herein by reference.

BACKGROUND

In the assembly of metal parts into a product or other component, welding is often used. For example, sheets of metal can be spot welded together, wherein the sheets are temporarily clamped together and a large current is forced through a small area of the overlapping sheets. The weld is formed by a partial melting of the metal in the small area. As a result, the weld usually does not protrude significantly above the sheet surface.

Welding is not always possible or practicable, however. In some situations, when an aluminum piece is to be joined to a steel piece, riveting is used instead of welding. For example, self-piercing rivets can be used. However, the rivet head protrudes above the flange through which it is fastened. Therefore, if another piece or surface abuts the fastened area, it must be positioned on top of or above the rivet heads.

SUMMARY

In a first aspect, a method of attaching an extruded piece to a component of a dissimilar material includes: providing an extruded piece having a mouth portion along at least part of its length, wherein an insert of a first material is attached to the extruded piece by the mouth portion; and welding the insert to a component of a second material, wherein the extruded piece is attached to the component.

Implementations can include any or all of the following features. The extruded piece comprises aluminum, and the first and second materials comprise steel. The extruded piece is a vehicle door sill. The mouth portion comprises jaws that in an open position form a slot between them, wherein the insert is fitted in the slot, and wherein in a closed position the jaws grip the insert to attach it to the extruded piece. The jaws are roller clinched from the open position into the closed position. The mouth portion comprises a channel that receives an edge of the insert, and wherein adhesive is placed in the channel before the insert is attached. Providing the extruded piece comprises extruding the extruded piece.

In a second aspect, a profile piece includes: an extruded piece of a first material having a mouth portion along at least part of its length; and an insert of a second material different than the first material, the insert attached to the extruded piece by the mouth portion, wherein the insert is configured for welding the profile piece to a component of a third material different than the first material.

Implementations can include any or all of the following features. The extruded piece comprises aluminum, and the second and third materials comprise steel. The profile piece is a vehicle door sill. The mouth portion comprises jaws that in an open position form a slot between them, wherein the insert is fitted in the slot, and wherein in a closed position the jaws grip the insert to attach it to the extruded piece. The jaws are roller clinched from the open position into the closed position. The mouth portion comprises a channel that receives an edge of the insert, and wherein adhesive is placed in the channel before the insert is attached.

In a third aspect, a method of manufacturing an extruded piece for being welded to a component of a dissimilar material includes: generating an extruded piece having a mouth portion along at least part of its length; attaching an insert of a first material to the extruded piece by the mouth portion; and welding the insert to a component of a second material, wherein the extruded piece is attached to the component.

Implementations can include any or all of the following features. The mouth portion comprises jaws that in an open position form a slot between them, wherein attaching the insert comprises fitting the insert in the slot, and bringing the jaws to a closed position where they grip the insert to attach it to the extruded piece. Bringing the jaws to the closed position comprises roller clinching the jaws. The mouth portion comprises a channel that receives an edge of the insert, the method further comprising placing adhesive in the channel before attaching the insert.

DETAILED DESCRIPTION

This document describes techniques for providing an insert of a dissimilar material in an extrusion piece. In some implementations, an extruded aluminum piece has a rolled section of steel securely attached along at least part of its length. For example, the attached steel strip can allow the aluminum piece to be fitted to a steel component by welding (e.g., spot welding). This can provide for fast and reliable attachment of the dissimilar material pieces to each other without protruding rivets.

Figure 1:
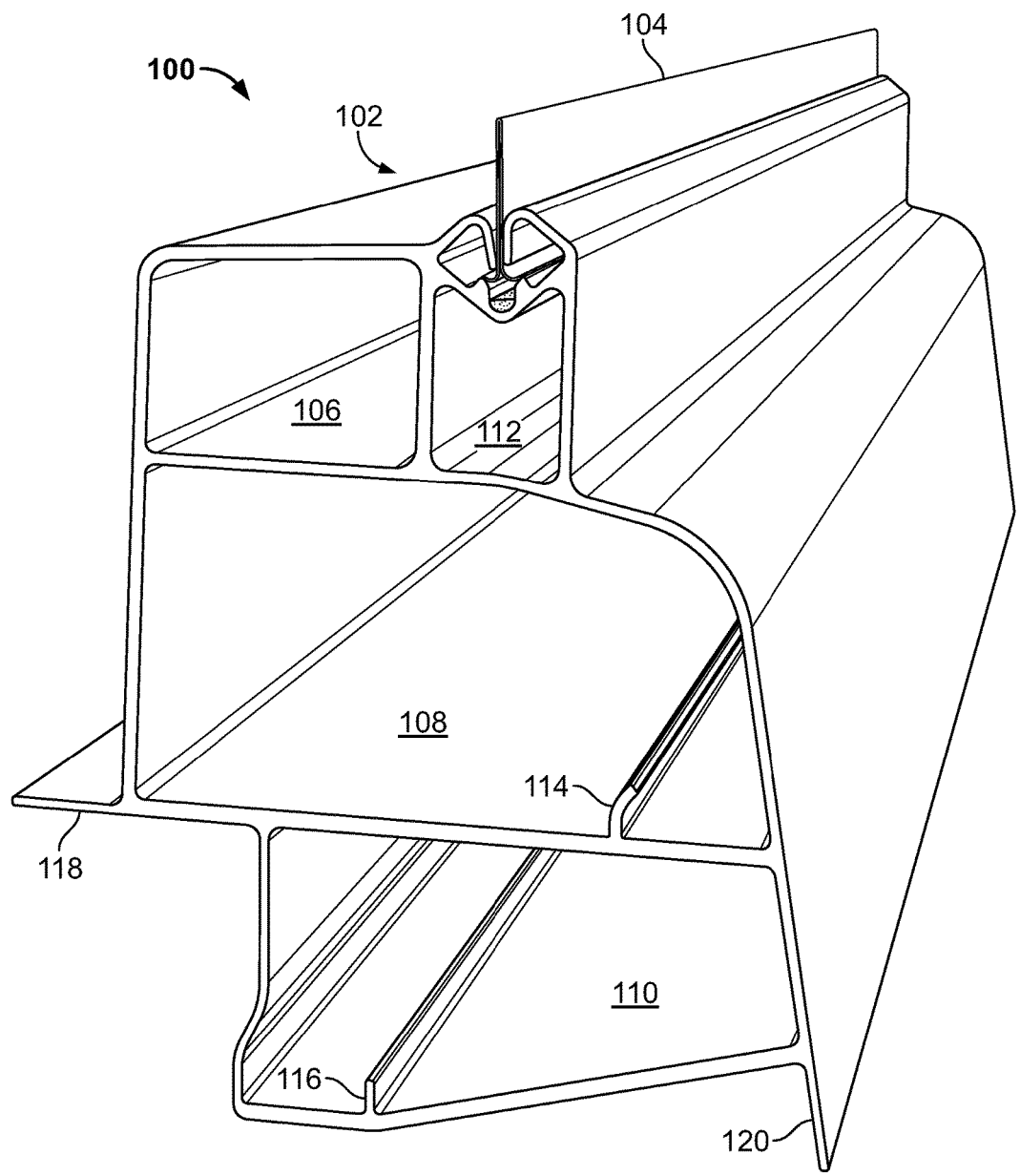
FIG. 1 shows an example of an extrusion piece with a mouth portion in an open position.

FIG. 1 shows an example of an extrusion piece 100 with a mouth portion 102 in an open position. A steel section 104 is currently being assembled into the mouth portion. The secure attachment of the steel section will be described below.

In this example, the extrusion piece 100 is a door sill for a vehicle. The door sill is part of the assembly of panel structures that make up the vehicle body. The door sill is sometimes referred to as a rocker or just as a sill. The door sill is located below the door opening(s) on the side of the vehicle. Here, a shorter section of the door sill is shown for simplicity, but the sill usually runs generally between the front and rear wheel wells.

The extrusion piece 100 can be formed by extrusion of aluminum or an aluminum alloy, to name just two examples. Particularly, the piece is extruded so that it has one or more interior channels running substantially along the length of the piece. For example, interior channels 106, 108, 110 and 112 are formed here. As examples only, it will be mentioned that the extrusion piece can be between about 150 and 200 millimeters wide and between about 200 and 275 millimeters tall. Different dimensions can be used in some implementations. Similarly, non-limiting examples of material thickness are that the walls are about two to five millimeters thick. Different thicknesses can be used in some implementations. One or more walls of an extruded piece can have a different thickness than another wall.

One or more features can be provided on the extrusion piece 100. In some implementations, at least one internal feature 114 or 116 is provided. In some implementations, at least one external feature 118 or 120 is provided. For example, such feature(s) can span the entire length of the piece, or only along a part thereof. As another example, an internal feature can extend fully or only partly into any particular channel, such as radially into the center of the channels 106-112. The function of a feature can be to reinforce the extrusion piece and/or to provide some other benefit. In some implementations, external feature 118 can be a mounting flange or lip that extends inward towards the vehicle centerline. For example, the external feature can provide a mounting surface for another component, such as a vehicle floor panel.

A component having an insert as described herein can be used in virtually any type of vehicle. In some implementations, such a vehicle is an electric vehicle or a hybrid vehicle. For example, when the battery pack of an electric car is at least in part located in the bottom of the vehicle, the door sill in the current examples can be attached to such a battery pack.

Figure 2:
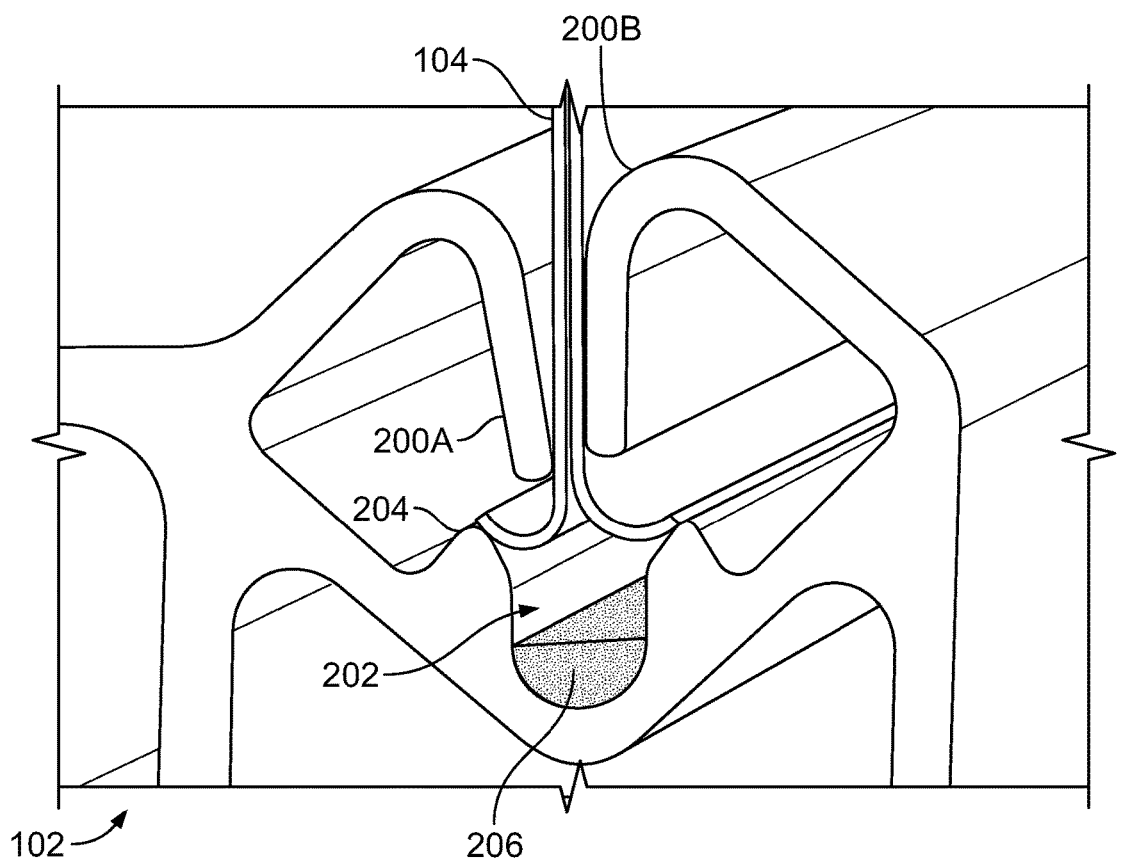
FIG. 2 shows the mouth portion of FIG. 1.

FIG. 2 shows the mouth portion 102 of FIG. 1. The mouth portion includes jaws 200A-B that are formed in the extrusion process. The jaws are initially shaped so as to leave a slot between them that forms the opening of the mouth portion. In some implementations, such opening extends along the entire extrusion piece.

Currently, the steel section 104 has been fitted in between the jaws as part of the process of fully inserting the section. In some implementations, the jaws are initially positioned so that the formed opening is narrower than the section (e.g., of rolled steel) intended to be fit inside. Accordingly, the steel section can be forced inward to enter the mouth portion, partially deforming/dislocating the jaws in the process.

Inside the mouth portion 102 an open channel 202 is formed. For example, the channel can be formed in the extrusion process by the presence of two structures 204 that oppose each other. The dimensions and/or shapes of the mouth portion, jaws and/or the channel can be selected based on the dimension of the steel section and the strength requirement for the resulting component, to name just two examples.

The steel section can be a rolled steel section. In some implementations, a steel section of a desired height is made from a steel sheet that has essentially twice the desired height, which is then folded in half to decrease its height and increase its thickness. The side of the steel section that enters the mouth portion 102 can have one or more features that enhance the attachment to the extrusion piece. For example, the lower edges of the steel section can be rolled outward to provide a structure that mates with the structures 204 in the channel 202.

An adhesive 206 can be added inside the channel, for example at the bottom thereof. In some implementations, a bead of adhesive is applied using a dispenser with a narrow tip, shortly before the steel section is to be inserted. The purpose of the adhesive in this example is to attach the steel section 104 to the extrusion piece when the steel section is fully inserted into the mouth portion. Any adhesive suitable to the materials involved can be used, including, but not limited to, an epoxy or polyurethane adhesive.

Figure 3:
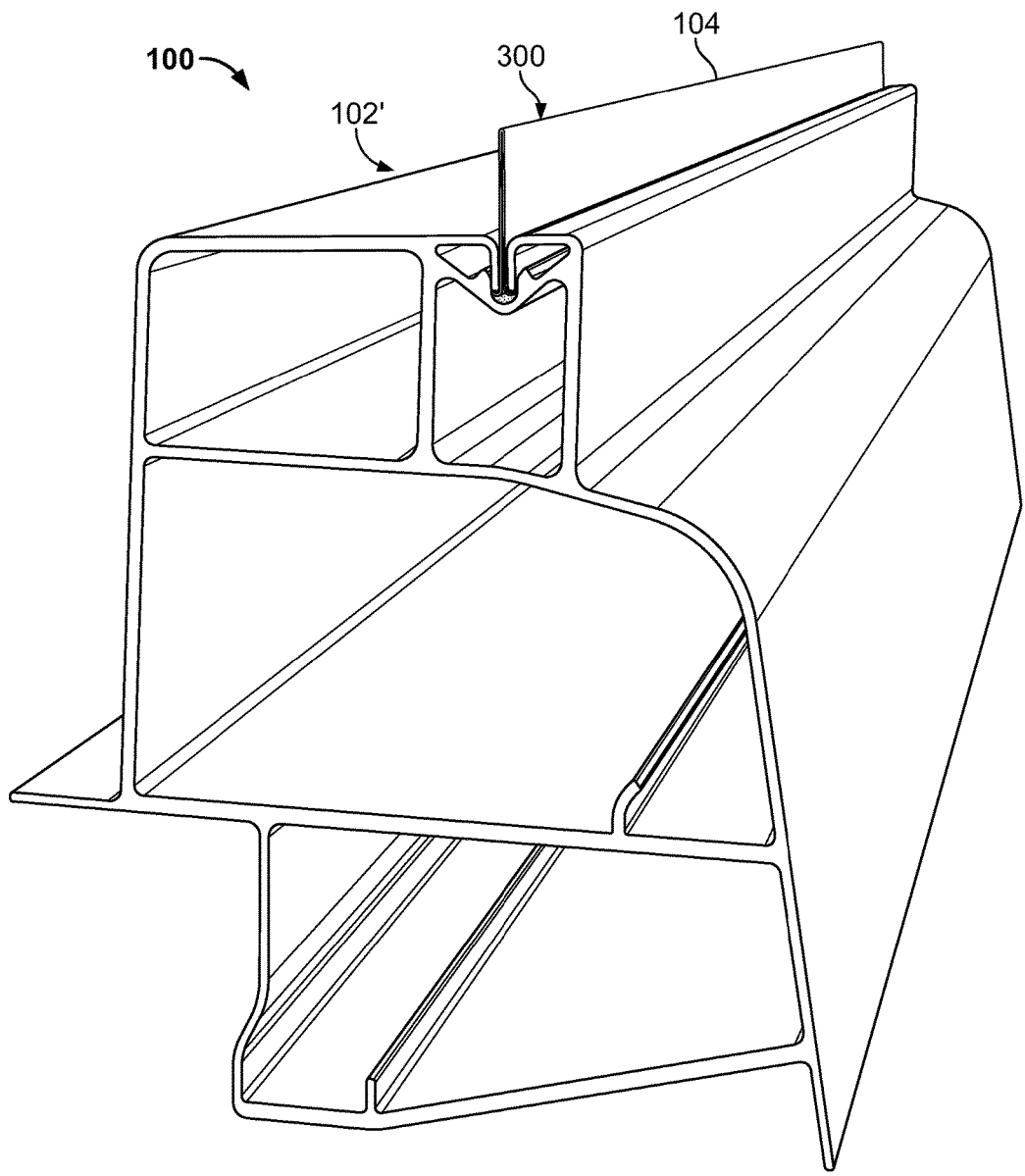
FIG. 3 shows an example of the extrusion piece from FIG. 1 where the mouth portion has been roller clinched into a closed position.

FIG. 3 shows an example of the extrusion piece 100 from FIG. 1 where the mouth portion has been roller clinched into a closed position. Here, the jaws have essentially been bent or deformed downward until they meet with the structures that form the channel inside the mouth portion. Particularly, this bending/deformation of the jaws has also pressed the steel section 104 into the channel, near to the bottom thereof. For example, when the steel section has outwardly rolled edges, the jaws can engage such edges and drive the steel sheet into the channel. That is, in the current state, the adhesive has engaged also with the steel surface. When set, the adhesive—together with the grip of the jaws—securely holds the steel section in position.

An edge 300 of the steel section that is opposite the adhesive edge therefore extends out from the extrusion piece, in this implementation vertically. In some implementations, the steel section 104 (e.g., the edge 300 thereof) can be used for attaching the extrusion piece to one or more components of a dissimilar material. The protruding section can essentially form a steel weld flange that allows the aluminum piece to be welded to another material. For example, the steel section can be spot welded to another steel component, thus in a sense allowing two dissimilar materials (e.g., aluminum and steel) to be welded to each other.

A door sill (or rocker) has been used as an example in the above. In some implementations, another extrusion component can be provided with an insert of a dissimilar material. For example, and without limitation, the B pillar of a vehicle is typically made of steel and may need components of dissimilar materials (e.g., aluminum) attached thereto by welding, brazing, soldering or any similar technique. Such other component(s) can therefore be provided with one or more rolled steel sections to facilitate attachment to the B pillar (e.g., by spot welding).

A number of examples have been described herein. Other implementations are within the scope of the following claims.

What is claimed is:

1. A profile piece comprising:
an extruded piece of a first material having a mouth portion along at least part of its length, the mouth portion comprising jaws that in an open position form a slot between them; and
an insert of a second material different than the first material, the insert attached to the extruded piece by the mouth portion, wherein the insert is configured for welding the profile piece to a component of a third material different than the first material, wherein the insert is fitted in the slot, and wherein in a closed position the jaws grip the insert to attach it to the extruded piece, wherein the mouth portion comprises a channel that receives an edge of the insert.

2. The profile piece of claim 1, wherein the insert is attached to the channel by an adhesive.

3. The profile piece of claim 1, wherein the extruded piece comprises aluminum, and the second and third materials comprise steel.

4. The profile piece of claim 1, wherein the profile piece is a vehicle door sill.

5. The profile piece of claim 1, wherein the jaws are roller clinched from the open position into the closed position.

6. The profile piece of claim 1, wherein the mouth portion is formed in a portion of a cross section of the extruded piece where the jaws are initially formed by members arranged in a V-shape with arms extending from the respective members.

7. The profile piece of claim 6, wherein each of the arms is angled about perpendicular to the respective member.

8. The profile piece of claim 7, wherein an outer end of each arm is folded back toward a center of the V-shape.

9. The profile piece of claim 8, wherein each of the outer ends is folded more than ninety degrees relative to a remainder of the arm.

10. The profile piece of claim 8, wherein the insert is attached by driving at least part of the outer ends into the channel by urging the arms toward the V-shape.

11. The profile piece of claim 10, wherein the edge of the insert comprises rolled edges extending in opposite directions, and wherein the outer ends are driven into the channel by conforming the rolled edges to a form of the channel.

12. The profile piece of claim 1, wherein the insert comprises two blades sandwiched together.

13. The profile piece of claim 12, wherein at the edge of the insert, the end of each of the blades extends outward.

14. The profile piece of claim 13, wherein the ends of the blades form a shape corresponding to a shape of the channel.

15. The profile piece of claim 1, wherein before the insert is fitted into the slot, the mouth portion and the jaws form essentially a square shape, and wherein after the insert is fitted into the slot, the mouth portion and the jaws form essentially a triangular shape.

16. The profile piece of claim 15, wherein after the insert is fitted into the slot the jaws form one side of the triangular shape.

17. The profile piece of claim 16, wherein after the insert is fitted into the slot the insert is essentially perpendicular to the one side of the triangular shape.

* * * * *